Aug. 2, 1960
E. R. PRICE
2,947,387
POWER OPERATED BRAKING SYSTEM
Filed March 31, 1958
2 Sheets-Sheet 2
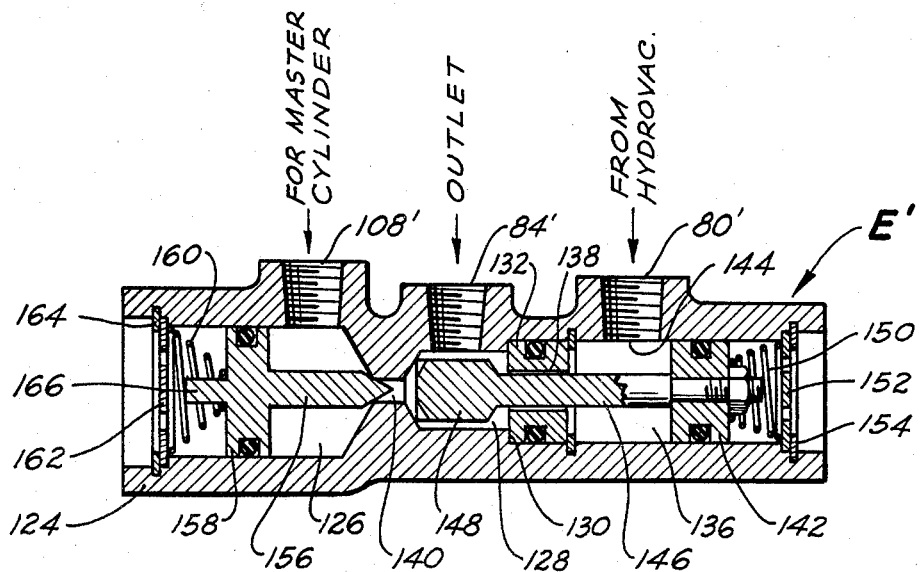
FIG_2
INVENTOR.
EARL. R. PRICE.
BY
William P. Hickey
ATTORNEY United States Patent Office 2,947,387
Patented Aug. 2, 1960

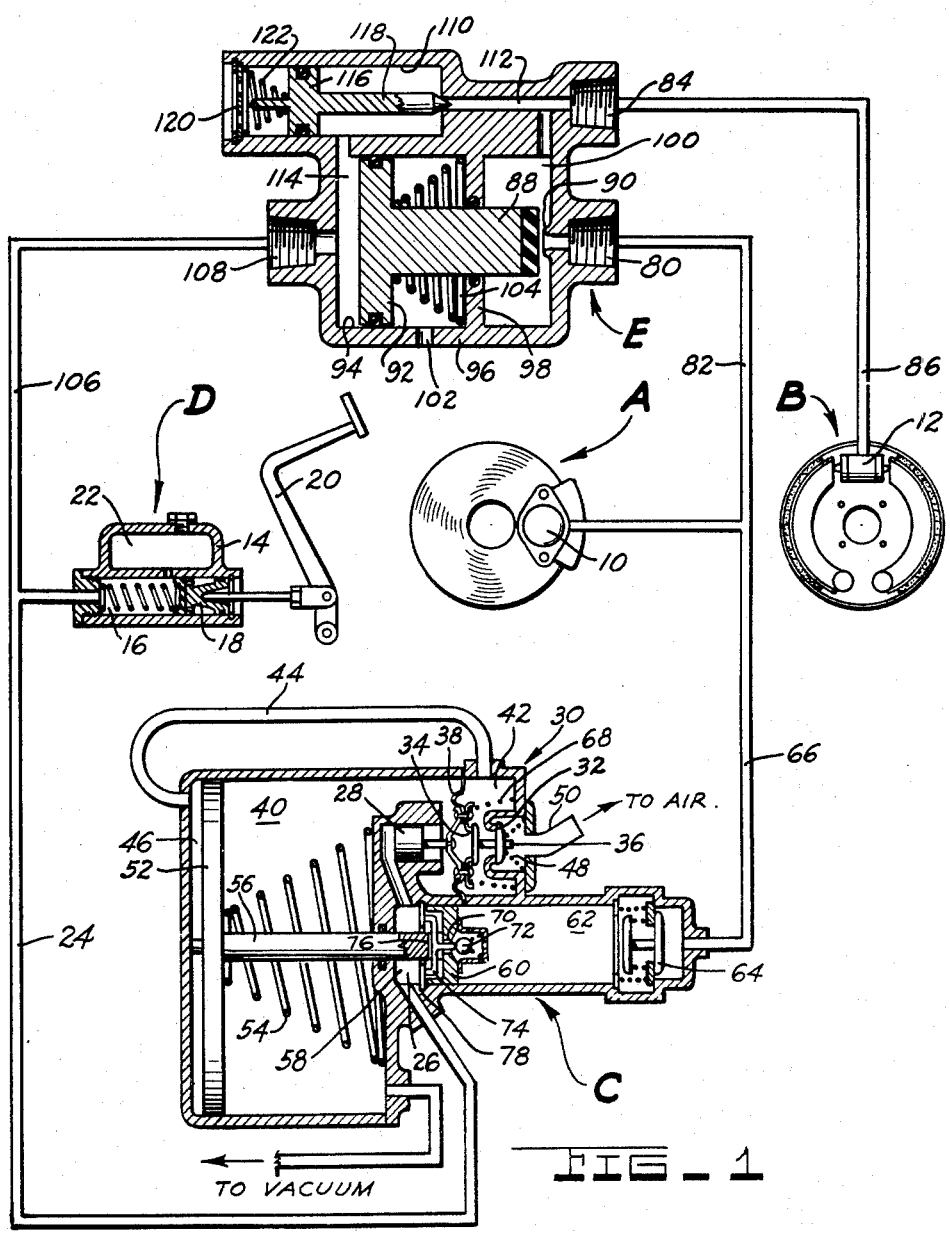

2,947,387

POWER OPERATED BRAKING SYSTEM

Earl R. Price, South Bend, Ind., assignor to Bendix Aviation Corporation, South Bend, Ind., a corporation of Delaware Filed Mar. 31, 1958, Ser. No. 725,348

8 Claims. (Cl. 188—152)

The present invention relates to power operated braking systems for automotive vehicles and the like of a type whose front wheels are braked by mechanisms of the disc type and whose rear wheels are braked by mechanisms of the shoe type; and more particularly to braking systems of the above mentioned type wherein a primary pressure producing device is used to control a servomotor driven pressure intensifying unit whose discharge produces actuation of both the front and rear wheel brakes during an initial stage of brake actuation, and wherein valve means are utilized to valve off said intensifying unit from the rear brakes, and thereafter actuate the rear brakes by means of direct pressure from the primary pressure producing device during a subsequent stage of brake actuation.

As is well known in the art, disc type brakes can dissipate heat generated during their braking operation much faster than can the older shoe type brakes; so that disc type brakes can be used under more severe conditions than can the older shoe type brakes. On the other hand shoe type brakes can be built with a certain amount of self-energization therein; so that the amount of externally applied actuating force that is required to actuate the brake can be considerably less than that necessary to operate the disc type of brake. It is also well known in the art that a shift of weight occurs during the braking of automotive vehicles causing increasing amounts of the vehicle's weight to be thrown upon the front wheels of the vehicles as the rate of vehicle deceleration increases. Since this is the case, the front wheel brakes of a motor vehicle are called upon to produce a greater amount of braking effort than are its rear wheel brakes; and under the present trend towards heavier and faster vehicles, the use of the shoe type brake for braking of the front wheels of the vehicle has in many instances proven inadequate.

An object of the present invention is the provision of a new and improved automotive braking system and the like, wherein the brake structures for braking the front wheels of the vehicle will be of the disc type, the brake structures for braking the rear wheels of the vehicle will be of the shoe type, and wherein a modulating pressure producing device is used to control a servomotor driven fluid pressure intensifying unit whose discharge actuates both the front and rear wheel brakes during an initial stage of brake actuation, and wherein a regulating valve is used to valve off the servomotor driven fluid intensifying device from the rear wheel brakes and thereafter actuate the rear brakes by means of direct pressure from the primary pressure producing device during a subsequent stage of brake actuation.

Another object of the invention is the provision of a new and improved braking system of the above described type wherein the initial brake applying period ends at about the time that the shoes of the rear wheel brakes move into engagement with their brake drum; so that most of the fluid which need be displaced to initially actuate the front and rear wheel brakes will be delivered by the servomotor intensifying unit, and thereafter the servomotor unit will be used solely to apply the force necessary to operate the front disc brakes while the primary fluid pressurizing device will be used to directly actuate the rear shoe brakes.

The invention resides in certain constructions and combinations and arrangements of parts; and further objects and advantages will become apparent to those skilled in the art to which the invention relates from the following description of the preferred embodiments described with reference to the accompanying drawings forming a part of the specification, and in which:

Figure 1 is a schematic view of an automotive braking system showing several of its major parts in cross section to illustrate the principles of the present invention;

Figure 2 is a cross sectional view of a second embodiment of a regulating valve which can be used in place of the one shown in Figure 1.

As previously explained, the present invention relates to a type of power operated braking system wherein part of the actuated brake structures are of the disc type and the remainder of the actuated brake structures are of the shoe type. As previously explained, disc type brakes require much higher fluid actuating pressures than do shoe type brakes; and inasmuch as a certain amount of self-energization can be built into a shoe type brake, the amount of braking effort which will be produced for a given fluid actuating pressure will vary greatly when the same fluid actuating pressure is used to simultaneously actuate both types of brakes.

Figure 1 of the drawings schematically shows an automotive braking system wherein the brakes on the front wheels of the vehicle are of the disc type A, each of which are operated by means of a fluid pressure motor 10 (only one of which is shown) and having rear wheel brakes of the shoe type B each of which are actuated by means of a fluid pressure wheel cylinder 12 (only one of which is shown). The braking system shown in the drawing is intended to be power actuated, at least in part, by means of a fluid pressure servomotor driven fluid intensifying unit C which receives a hydraulic input signal from pressure modulating means D and which discharges its intensified pressure to the fluid pressure motors 10 and 12 of the disc and shoe brakes A and B respectively. The system further includes regulating valve structure E operatively interpositioned between the brake structures A and B for regulating the control pressure that is supplied to the rear shoe brake structure B as will later be explained in detail.

The system may be controlled by means of any pressure producing device whose output pressure may be adequately modulated such as a hydraulic pump whose discharge pressure is regulated by suitable control valve structure; and is shown in the drawing as controlled by means of a conventional master cylinder 14 having a suitable fluid pressurizing chamber 16 therein from which fluid is displaced by means of a displacement plunger 18. The displacement plunger 18 is stroked by a foot pedal lever 20, and the master cylinder is also provided with a reservoir 22 which holds a reserve of hydraulic fluid that can be used to compensate for fluid volume changes in the system due to thermal expansion etc.

The discharge from the master cylinder 14 is communicated through a conduit 24 to the follow-up chamber 26 of the servomotor fluid pressure intensifying unit C. Pressure from the follow-up chamber 26 is communicated to the back side of a hydraulic piston 28 in the end casting of the servomotor unit, which piston 28 is used to actuate the control valve structure 30 of the servomotor unit. The control valve structure 30 comprises axially aligned atmospheric and vacuum valve seats 32 and 34 respectively, air flow through which can be simultaneously controlled by means of a spool-shaped poppet member 36 whose respective end flange portions are adapted to abut the valve seats 32 and 34 respectively. The atmospheric valve seat is integrally cast in one end of the servomotor structure, and the vacuum valve seat 34 is carried by a flexible diaphragm structure 38 which separates the front power chamber 40 of the servomotor structure from the control chamber 42 of the control valve structure 30. A supply of vacuum, as for example that obtained from the manifold of the vehicle's propelling engine, is continually communicated to the front power chamber 40 of the servomotor; and in the normal condition of the servomotor unit C, vacuum is communicated past the vacuum valve seat 34 to the control chamber 42, and thence through conduit 44 to the rear powered chamber 46 of the servo motor unit C. The hydraulic piston 28 is rigidly connected to the vacuum valve seat 34; and upon an increase in pressure supplied to the follow-up chamber 26 from the system control means D, the vacuum valve seat 34 will be forced into sealing abutment with the rear flange of the spool-shaped poppet member 36 to close off further communication between the front and rear powered chambers 40 and 46 respectively. A further increase in pressure in the follow-up chamber 26 causes the valve closure spring 48 to be compressed and the front flange of the poppet member 36 to be lifted from engagement with the atmospheric valve seat 32 to thereby permit air pressure to flow from the tube 50 past the valve seat 32 to the rear powered chamber 46 of the servomotor unit.

The power piston 52 which separates the front and rear power chambers 40 and 46 respectively is biased into its retracted or most rearwardly position by means of the piston return spring 54; and upon a flow of air pressure to the rear power chamber 46, the piston 52 will be forced forwardly to compress the piston spring 54 and force its piston rod 56 into the hydraulic chamber 58 of the fluid intensifying unit C. The hydraulic chamber 58 contains a hydraulic piston 60 which separates its follow-up chamber 26 from its fluid pressurizing chamber 62; and upon forward movement of the piston rod 56, the hydraulic piston 60 is forced forwardly to displace fluid from the fluid pressurizing chamber 62. Fluid displaced from the fluid pressurizing chamber 62 passes through a conventional residual pressure check valve structure 64 and thence through a discharge conduit 66 to the fluid pressure motor 10 of the vehicle's disc type front brake A. The residual pressure check valve structure 64 functions to always maintain a slight positive pressure in the discharge conduit 66; and for a more complete understanding of its construction and operation, reference may be had to the Earl R. Price Patent No. 2,402,344. In the normal de-energized condition of the braking system shown in Figure 1, the vacuum valve seat 34 will normally be held out of engagement with the spool-shaped poppet member 36 by the coil spring 68, so that vacuum which is continually communicated with the front power chamber 40 will also be communicated with the rear power chamber 46 of the servomotor structure.

Operation of the system so far described will be initiated by a depressing of the foot pedal lever 20 whereupon fluid pressure generated in the fluid pressurizing chamber 16 of the master cylinder 14 will be communicated through the line 24 to the follow-up chamber 26 of the servomotor driven intensifying unit C. An increase in hydraulic pressure within the follow-up chamber 26 causes the hydraulic piston 28 to move the vacuum valve seat 34 into engagement with the spool-shaped poppet member 36, and thereby isolate the rear power chamber 46 from the front power chamber 40. Further forward movement of the hydraulic piston 28 causes the front flange of the spool-shaped poppet member 36 to be lifted from the atmospheric valve seat 32 to thereafter communicate air pressure to the rear power chamber 46 to drive the power piston rod 56 forwardly into the hydraulic chamber 58.

The fluid pressure intensifying unit C is of the type which will permit its input signal to be communicated directly with its discharge without moving any of its power driven elements upon a failure in the vacuum supply to the servomotor unit; and accordingly its hydraulic piston 60 is provided with a flow passage 70 therethrough which is adapted to be closed off by a ball check structure 72. The ball check structure 72 is positioned adjacent the forward face of the hydraulic piston 60 so that pressure generated within the fluid pressurizing chamber 62 will cause the ball check valve structure 72 to close off the flow passage 70. In the normal de-energized condition of the pressure intensifying unit, the ball check valve structure 72 will be held in an open position by means of a wishbone-shaped abutment structure 74 which projects through the passageway 70 and lifts the ball check structure 72 out of engagement with the front face of the hydraulic piston 60. The wishbone structure 74 is loosely carried in a milled slot 76 in the end of the piston rod 56; and in the retracted position of the piston rod, the rear end of the wishbone 74 abuts a fixed ring 78 to cause the wishbone structure 74 to open the ball check structure 72. For a more complete understanding of the construction and operation of the pressure intensifying unit shown in the drawing, reference may be had to the E. J. Ringer Patent No. 2,598,604.

Initial forward movement of the piston rod 56 as produced during a power actuation of the pressure intensifying unit permits the wishbone structure 74 to move rearwardly relative to the piston 60 and the ball check structure 72 to close. Thereafter forward movement of the hydraulic piston 60 causes fluid to be displaced from the fluid pressurizing chamber 62 which then proceeds to the fluid pressure motor 10 to actuate the front disc brake A of the vehicle.

The servomotor fluid pressure intensifying unit shown in the drawing is adapted to develop a hydraulic pressure within the fluid pressurizing chamber 62 which is approximately three times that of the hydraulic control signal supplied to the follow-up chamber 26; and when the hydraulic discharge pressure corresponding to the hydraulic input signal is reached, sufficient air pressure will have been delivered to the control chamber 42 of the control valve structure 30 to bias the vacuum diaphragm 38 rearwardly sufficiently to permit a seating of the spool-shaped poppet member upon the atmospheric valve seat 32 and thereafter prevent a further increase in pressure within the fluid pressurizing chamber 62.

A retraction of the foot pedal lever 20 will, of course, permit a reduction of pressure behind the piston 28 so that the vacuum valve seat 34 will move rearwardly out of engagement with the spool-shaped poppet member 36 and thereby reduce the pressure within the rear power chamber 46 of the servomotor. Should the foot pedal lever 20 be only partially retracted, the pressure in the control chamber 42 will be reduced by an amount permitting the vacuum valve seat to again abut the spool-shaped poppet member 36 and thereby cause the control valve structure 30 to again become lapped at a degree of servomotor energization corresponding with the input signal being supplied to the follow-up chamber 26. A complete retraction of the foot pedal lever 20 will, of course, permit the vacuum valve seat 34 to be biased completely out of engagement with the spool-shaped poppet member 36 by the coil spring 68 so that a complete retraction of the power piston 52 will take place. As the hydraulic piston 60 again approaches the fixed ring 78, the wishbone structure 74 will again be forced through the passage 70 to open the ball check valve structure 72 to thereafter permit communication between the follow-up chamber 26 and the fluid pressure chamber 62.

As previously indicated the braking system shown on Figure 1 is provided with a regulating valve structure E for permitting the discharge pressure of the servomotor driven fluid pressure intensifying unit C to actuate the rear shoe brake structure B until a generally predetermined pressure is reached; after which time, the pressure intensifying unit C will be valved off from the rear brake structure B and the system control means D will be communicated directly thereto. The valve structure E shown in Figure 1 comprises an inlet port 80 that is connected to the discharge conduit 66 by a branch line 82, and an outlet port 84 that is communicated with the fluid pressure wheel cylinder 12 by conduit 86. Communication between the inlet and outlet ports 80 and 84 is adapted to be prevented by means of a closure member 88 that is adapted to abut a valve seat 90 surrounding the inlet port 80, and which closure member 88 is driven by a hydraulic fluid pressure motor or piston 92 that is received within the cylindrical bore 94 within the valve body member 96.

In the embodiment shown in the drawing the valve closure member 88 is formed as an integral axially extending boss upon the hydraulic piston 92, and extends through an inner partition wall 98 that separates the cylinder bore 94 from the chamber 100 which communicates the inlet and outlet ports 80 and 84 respectively. Atmospheric pressure is communicated to the front side of the hydraulic piston 92 by means of a bleed hole 102, and the closure member 88 is normally biased out of engagement with the seat 90 by means of a piston return spring 104 that is interpositioned between the piston 92 and the inner partition wall 98. Pressure from the discharge of the master cylinder D is communicated with the back face of the piston 92 by means of a conduit 106 and a second pressure inlet port 108.

The piston 92 and the return spring 104 may be sized to cause the valve closure member 88 to close off the port 80 at a master cylinder discharge pressure which will correspond with any desired output pressure from the fluid pressure intensifying unit C; and in the preferred system shown in the drawing, will be designed to close off the port 80 when the output pressure from the intensifying unit C reaches a pressure of approximately 150 p.s.i. Most of the shoe brakes manufactured by the assignee of the present application have shoe return springs therein which require approximately 150 p.s.i. to be delivered to its wheel cylinder 12 in order that the brake shoes will be moved into engagement with the cooperating brake drum; and in the preferred system shown in the drawing, it is desired to permit the fluid discharged from the intensifying unit C to cause the brake shoes to be moved out into engagement with their drum before the valve port 80 is closed off by the closure member 88. Inasmuch as the intensifying unit C has been designed to deliver an output pressure of approximately three times that of the input signals supplied thereto by the master cylinder D, the piston 92 and the return spring 104 will be designed to cause the closure member 88 to abut the seat 90 when a pressure of approximately 50 p.s.i. is delivered to the rear face of the piston 92.

In the operation of the system so far described, depressing of the foot pedal lever 20 causes an increase in pressure to be communicated both to the fluid intensifying unit C and to the back face of the piston 92. The control valve structure 30 is so designed as to cause the servomotor unit to come into actuation at an input signal pressure of approximately 15 p.s.i.; so that the initial fluid displaced from the master cylinder D will cause the pressure intensifying unit to be actuated and the pressure to rise in its fluid pressurizing chamber at a rate of approximately three times that of the control signal. While the discharge pressure of the control means D rises from approximately 15 p.s.i. to 50 p.s.i., the pressure within the fluid pressurizing chamber 62 will increase from 15 p.s.i. to just under approximately 150 p.s.i.; and the pressure from chamber 62 will simultaneously be communicated with the fluid pressure motors 10 and 12 of the front and rear brake structures A and B respectively. The front disc brake A will begin to be actuated at a very low pressure of approximately 15 p.s.i., so that gradually increasing braking effort will be developed by the disc brake A as the pressure increases to the 150 p.s.i. level. The initial displacement from the fluid intensifying unit C, therefore, performs the bulk of the work of moving the brake shoes into engagement with their brake drum, but produces substantially no braking effort upon the rear wheels of the vehicle. When the pressure delivered by the control means D reaches slightly more than 50 p.s.i., the piston 92 is moved forwardly to cause the closure member 88 to seal off the inlet port 80; and thereafter further communication between the fluid intensifying unit C and the shoe brake structure B is prevented.

Inasmuch as shoe brakes are usually built with a certain degree of self energization into their structure, it is desired to actuate the shoe brake structure B by means of the pressure produced by the master cylinder D once the shoes have been moved into engagement with their drum, while the disc brake structure A is actuated by the greatly intensified pressure produced by the intensifying unit C. The regulating valve structure E, therefore, also includes suitable valve structure for communicating its second pressure inlet port 108 with its outlet port 84. In some instances it may be desired to communicate the outlet port 84 with the second inlet port 108 prior to the time that the first inlet port 80 is closed off; but in the preferred arrangement, it is desired to prevent communication between the second pressure inlet port 108 and the outlet port 84 until such time as the pressure from the control means D exceeds the pressure in the outlet port 84, by reason of the fact that the discharge pressure of the fluid intensifying unit C would otherwise be communicated back into its input signal side to produce a self energization of the fluid pressure intensifying unit C.

The valve structure shown in Figure 1 for controlling communication between the second pressure inlet port 108 and the outlet port 84 comprises a cylinder bore 110 having an axially positioned valve port 112 on its inner end which communicates directly to the outlet port 84. Fluid pressure from the second inlet port 108 is communicated to the inner end of the cylinder bore 110 by means of a passageway 114, and a hydraulic piston 116 is positioned between the passageway 114 and the outer end of the cylinder bore 110 which is always in communication with the atmosphere. The piston 116 includes an axially projecting valve closure member adapted to abut the inner end of the cylinder bore 110 and close off valve port 112. The outer end of the cylinder bore 110 is provided with a suitable closure member 120 having holes therethrough, and a coil spring 122 is positioned between the piston 116 and the closure member 120 to bias the valve closure member 118 into its closed position with sufficient force as to require a hydraulic pressure of approximately 160 p.s.i. to be developed by the master cylinder D before the coil spring 122 is compressed sufficiently to open communication between the passageway 114 and the outlet port 84. An increase in pressure from the master cylinder D, in the range of from 50 to 150 p.s.i., will therefore cause the first inlet port 80 to be held closed, while modulated braking effort is being produced solely upon the front disc brake unit A. It will be seen that the pressure delivered to the fluid pressure motor 10 of the disc brake A will be changed from 150 p.s.i. to approximately 450 p.s.i. while the output pressure of the master cylinder D is changing from 50 p.s.i. to approximately 150 p.s.i. When the discharge pressure of the control means D reaches approximately 160 p.s.i., the piston 116 will move rearwardly to thereafter permit the pressure from the master cylinder D to be communicated directly to the fluid pressure motor 12 of the rear shoe brake B. Increasing output pressure of the master cylinder D will thereafter be communicated directly to the wheel cylinder 12, while a pressure approximately three times as great is being delivered to the fluid pressure motor 10 of the disc brake A by the fluid pressure intensifying unit C.

A retraction of the foot pedal lever will permit fluid from the rear wheel brakes to flow back through the passage 112 to the master cylinder 14 until pressures below 160 p.s.i. is reached, whereupon the piston 116 again closes the port 112. Substantially, no further braking effort is produced by the rear wheel brakes at this pressure, so that reduction of the output pressure of the master cylinder D from 150 to 50 p.s.i. permits a modulation of pressure upon the front wheel brakes, while a pressure of 160 p.s.i. is held upon the rear wheel brakes B. When the output pressure of the master cylinder D drops slightly below 50 p.s.i., the valve port 80 is opened permitting fluid from the rear wheel brakes to flow back through the lines 82 and 66 to the fluid intensifying unit C; and when completely released, through the passageway 70 to the master cylinder D.

Referring now to Figure 2 there is shown therein another type of regulating valve structure designated E' which can be used in place of the regulating valve E shown in Figure 1. The housing of the regulating valve structure E' is capable of being produced from bar stock material. The valve operates in a similar manner to that of the valve structure E shown in Figure 1, with the exception that in the valve structure E', pressure from the servo-motor driven fluid intensifying unit C is used to close communication between the valve's first inlet port 80' and the valve's outlet port 84', while in the valve structure E pressure from the master cylinder 14 is used to perform the same function. As previously indicated, the valve structure E' is formed from a body member 124 made from a piece of bar stock which is provided with a first valve chamber 126 adjacent to its left end by a large diameter axially extending bore, and a second valve chamber 128 formed in the central portion of the valve by a smaller diameter axially extending bore. The bore forming the second valve chamber 128 is counterbored to provide a shoulder 130 against which an annular valve seat 132 is positioned to divide the bore 128 into a central valve chamber 128 and a right hand valve chamber 136. The first inlet valve port 80' communicates with the right hand chamber 136; the outlet port 84' communicates with the central valve chamber 128; and the second inlet port 108', which communicates with the master cylinder D, communicates with the left hand valve chamber 126.

Communication between the valve ports 80' and 84' is had through the central opening 138 of the annular valve seat member 132, and communication between the valve ports 84' and 108' is had through a small diameter axially extending passageway 140 communicating the left hand valve chamber 126 with the central valve chamber 128. Flow communication between the valve ports 80' and 84' is controlled by a piston 142 positioned in the counterbore 144 outwardly of the first inlet port 80'; so that pressure from the pressure intensifying unit C causes the piston 142 to move outwardly away from the annular valve seat member 132. The piston 142 is provided with a headed valve stem, the stem portion 146 of which extends through the opening 138 of the annular valve seat member 132, and the head portion 148 of which is positioned in the central valve chamber 128 for abutment with the annular valve seat member 132. The head portion 148 is adapted to be pulled into engagement with the inner end of the annular valve seat member 132 by the piston 142 to close off communication through the central opening 138 of the annular valve seat member 132. The piston 142 is biased inwardly by a coil spring 150 with sufficient force so as to require a pressure of approximately 150 p.s.i. to be delivered into the right end valve chamber 136 by the fluid intensifying unit C before the spring 150 will collapse to permit the head portion 148 to abut the annular valve seat member 132. The inner end of the coil spring 150 is positioned against the outer end of the piston 142, and the outer end of the spring 150 is held in place by a foraminous disc 152 that is held in place by a snap ring 154.

The valve structure for controlling communication between the outlet port 84' and the second inlet port 108' is quite similar to that used in the valve structure E shown in Figure 1. The valve closure member for the valve port 140 is formed by a needle-shaped projection 156 integrally formed on the inner end of a piston 158 that is positioned outwardly of the port 108' in the left hand end valve chamber 126; so that pressure from the master cylinder 14 causes the port 140 to be opened. The piston 158 is biased to its position closing port 140 by a coil spring 160, one end of which abuts the outer end of the piston 158 and the other end of which is supported by a second foraminous disc-shaped closure member 162 that in turn is held in place by a snap ring 164. The piston 158 is also provided with an axial projection 166 on its outer face for abutment with the end closure member 162 to limit outward movement of the piston 158.

While the preferred embodiments of the invention have been described in considerable detail, I do not wish to be limited to the particular constructions shown, which may be varied within the scope of the invention; and it is the intention to cover hereby all novel adaptations, modifications and arrangements thereof which come within the practice of those skilled in the art to which the invention relates.

I claim:

1. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said servomotor to said first hydraulic fluid pressure motor; a manually actuatable fluid pressure modulating device the pressure discharge of which is communicated to said servomotor to control its operation; a first normally open valve structure for communicating the hydraulic output from said fluid pressure intensifying unit to said second fluid pressure motor; a second normally closed valve structure for communicating the output from said pressure modulating device to said second fluid pressure motor; and means for closing said first valve structure and for opening said second valve structure when the pressure supplied to said second fluid pressure motor rises above a generally predetermined level.

2. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said servomotor to said first hydraulic fluid pressure motor; a manually actuatable fluid pressure modulating device the pressure discharge of which is communicated to said servomotor to control its operation; a first normally open valve structure for communicating the hydraulic output from said fluid pressure intensifying unit to said second fluid pressure motor; a second normally closed valve structure for communicating the output from said pressure modulating device to said second fluid pressure motor; and means for closing said first valve structure when the output pressure from said fluid pressure intensifying unit rises to a generally predetermined level and for thereafter opening said second valve structure when the output pressure from said pressure modulating device reaches a pressure exceeding said generally predetermined level.

3. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said servomotor to said first hydraulic fluid pressure motor; a manually actuatable fluid pressure modulating device the pressure discharge of which is communicated to said servomotor to control its operation; a first normally open valve structure for communicating the hydraulic output from said fluid pressure intensifying unit to said second fluid pressure motor; a second normally closed valve structure for communicating the output from said pressure modulating device to said second fluid pressure motor; and means for closing said first valve structure when the output pressure from said pressure modulating device reaches a first generally predetermined level and for opening said second valve structure when said output pressure from said pressure modulating device reaches a second higher generally predetermined level.

4. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said servomotor to said first hydraulic fluid pressure motor; a manually actuatable fluid pressurizing master cylinder the pressure discharge of which is communicated to said servomotor to control its operation; a first normally open valve structure for communicating the hydraulic output from said fluid pressure intensifying unit to said second fluid pressure motor; a second normally closed valve structure for communicating the output from said master cylinder to said second fluid pressure motor; means subject to the discharge pressure of said fluid pressure intensifying unit for closing said first valve structure when said discharge pressure of said unit exceeds a generally predetermined level; and means subject to the discharge pressure of said master cylinder for opening said second valve structure when its discharge pressure exceeds a second generally predetermined level.

5. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said pressure intensifying unit to said first hydraulic fluid pressure motor; a manually actuatable fluid pressurizing master cylinder the pressure discharge of which is communicated to said servomotor to control its operation; a first normally open valve structure for communicating the hydraulic output from said fluid pressure intensifying unit to said second fluid pressure motor; a second normally closed valve structure for communicating the output from said master cylinder to said second fluid pressure motor; means subject to the discharge pressure of said pressure intensifying unit for closing said first valve structure when said discharge pressure of said unit exceeds a first generally predetermined level, and means subject to the discharge pressure of said master cylinder for opening said second valve structure when its discharge pressure exceeds a second generally predetermined level, said second generally predetermined level being slightly greater than said first generally predetermined level.

6. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said pressure intensifying unit to said first hydraulic fluid pressure motor; a manually actuatable fluid pressurizing master cylinder the pressure discharge of which is communicated to said servomotor to control its operation; a valve having an inlet port communicating with the discharge of said pressure intensifying unit and an outlet port communicating with said second hydraulic fluid pressure motor; a first valve structure including a movable element for closing off flow communication between said inlet and outlet ports; a third fluid pressure motor actuated by the pressure discharge of said master cylinder for closing said first valve structure when the pressure from said master cylinder exceeds a first generally predetermined pressure; second valve structure for controlling fluid pressure flow from said master cylinder to said outlet port, said second valve structure having a closure member arranged to be biased open by the pressure from said master cylinder; and a spring biasing said last mentioned closure member closed, said spring being constructed and arranged to hold said last mentioned closure member closed until a second generally predetermined pressure exceeding said first generally predetermined pressure is reached, said second generally predetermined pressure being slightly greater than the output pressure of said pressure intensifying unit which is developed when said servo motor receives an input signal corresponding to said first generally predetermined pressure.

7. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said pressure intensifying unit to said first hydraulic fluid pressure motor; a manually actuatable fluid pressurizing master cylinder the pressure discharge of which is communicated to said servomotor to control its operation; a valve having an inlet port communicating with the discharge of said pressure intensifying unit and an outlet port communicating with said second hydraulic fluid pressure motor; a first valve structure including a movable element for closing off flow communication between said inlet and outlet ports; a third fluid pressure motor actuated by the pressure discharge of said pressure intensifying unit for closing said first valve structure when the pressure from said pressure intensifying unit exceeds a first predetermined pressure; second valve structure for controlling fluid pressure flow from said master cylinder to said outlet port, said second valve structure having a closure member arranged to be biased open by the pressure from said master cylinder; and a spring biasing said last mentioned closure member closed, said spring being constructed and arranged to hold said last mentioned closure member closed until a second generally predetermined pressure exceeding said first generally predetermined pressure is reached.

8. In a hydraulic braking system for an automotive vehicle and the like: a disc brake for a front wheel of the vehicle, a first hydraulic fluid pressure motor for actuating said disc brake; a shoe brake for a rear wheel of the vehicle; a second hydraulic fluid pressure motor for actuating said shoe brake; a fluid pressure servomotor driven fluid pressure intensifying unit of the type constructed and arranged to intensify a hydraulic input signal; means communicating the intensified output pressure from said pressure intensifying unit to said first hydraulic fluid pressure motor; a manually actuatable fluid pressurizing master cylinder the pressure discharge of which is communicated to said servo motor to control its operation; a valve having an outlet port communicating with said second hydraulic fluid pressure motor, a first inlet port communicating with the discharge of said pressure intensifying unit and a second inlet port communicating with said master cylinder; a first normally open valve structure communicating said first inlet port and said outlet port, said first valve structure having a movable closure member which closes off said first valve structure when the pressure in said first inlet port exceeds a first generally predetermined level; a second normally closed valve structure for communicating said second inlet port and said outlet port, said second valve structure having a movable closure member which is held open by the pressure in said second inlet port when it exceeds said first generally predetermined pressure.

References Cited in the file of this patent

UNITED STATES PATENTS 2,207,173    Goepfrich  --------------- July 9, 1940

FOREIGN PATENTS 769,775    Great Britain  ----------- Mar. 13, 1957